C. L. COURSON.
INDICATING DEVICE FOR AIR BRAKE SYSTEMS.
APPLICATION FILED APR. 1, 1910.
990,707.
Patented Apr. 25, 1911.
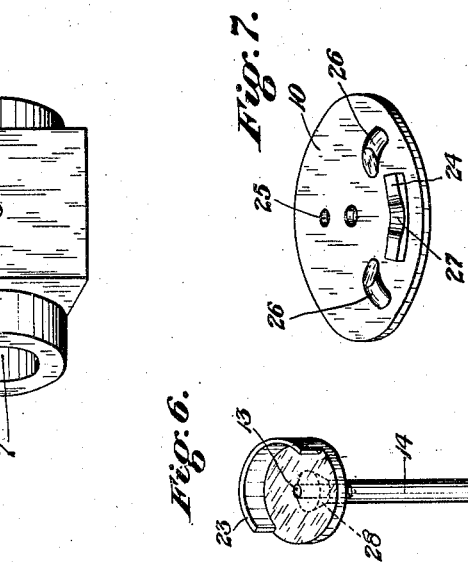
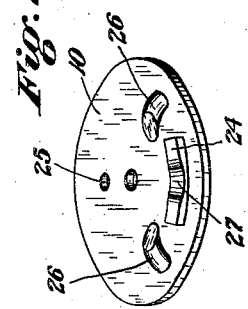
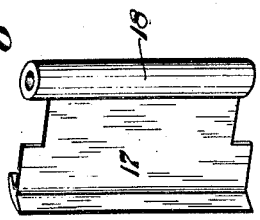
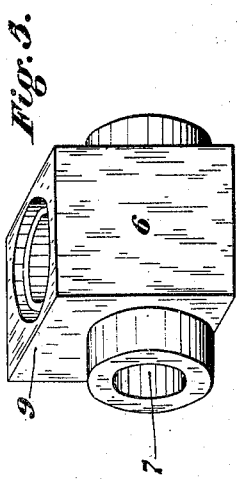
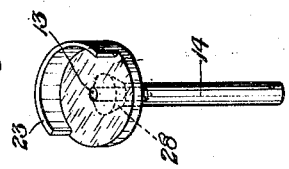
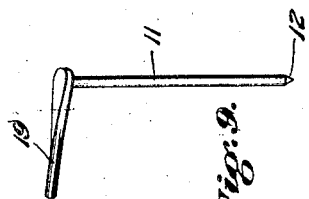
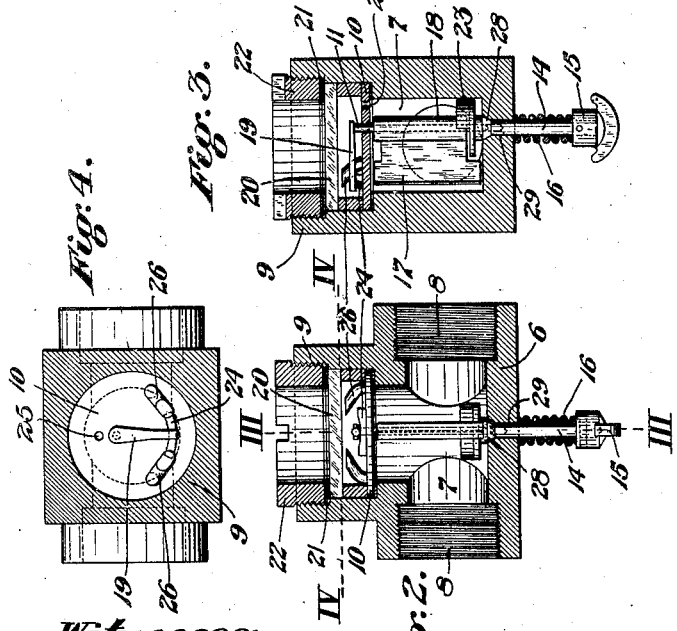
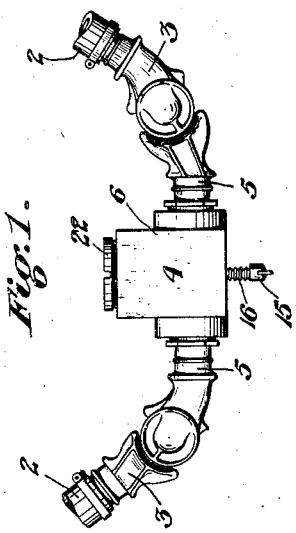
Witnesses:
Inventor:

UNITED STATES PATENT OFFICE.

CHARLES L. COURSON, OF PITCAIRN, PENNSYLVANIA.

INDICATING DEVICE FOR AIR-BRAKE SYSTEMS.

990,707.  Specification of Letters Patent.  Patented Apr. 25, 1911.

Application filed April 1, 1910. Serial No. 552,875.

*To all whom it may concern:*

Be it known that I, CHARLES L. COURSON, a citizen of the United States, residing at Pitcairn, in the county of Allegheny and State of Pennsylvania, have invented certain new and useful Improvements in Indicating Devices for Air-Brake Systems, of which the following is a specification, reference being had therein to the accompanying drawing.

My invention relates to improvements in air brakes and consists particularly of an indicating device adapted to be temporarily inserted in the train line between any two adjacent cars for indicating undesired quick action in the tripple valve. Ordinarily, where such undesired quick action occurs it is very difficult or impossible to locate the particular valve and results in very considerable trouble and unequal action of the brakes, resulting in broken trains and other accidents.

The present improvement particularly relates to means for arresting and holding the indicator hand and for releasing it again.

In the drawings illustrating the invention:—Figure 1 is a view in elevation showing the hose terminals of the train pipes of adjacent cars with the indicator inserted between them. Fig. 2 is a central longitudinal sectional view of the indicator on an enlarged scale. Fig. 3 is a vertical sectional view on the line III. III. of Fig. 2. Fig. 4 is a horizontal sectional view on the line IV. IV. of Fig. 2. Fig. 5 is an outside perspective view of the indicator case. Fig. 6 is a detail view of the vertically adjustable bearing for the vane. Fig. 7 is a detail of the locking mechanism for the vane. Fig. 8 is a detail of the vane. Fig. 9 is a detail of the indicator and the vane pivoting bearing.

Ordinarily, the train pipes of the Westinghouse or other air brake systems are provided with hose terminals 2, 2, having readily connected and disconnected terminal couplings 3, between which is located the indicator 4 having at each end short coupling extensions 5 provided with interfitting couplers adapted to make connection with the couplers of the hose in the same manner as the hose couplers themselves are connected. It is intended that the device shall be readily and quickly inserted or removed from the train pipe terminals between any two cars for the purpose of testing out to find the defective valve, and in use it is inserted in the manner described between the ends of the cars until the indicator locates the particular car carrying the defective valve.

The indicator 4 consists of a casing or body portion 6 which may be rectangular as shown or of other suitable shape having a longitudinal opening or passage way 7 throughout its middle body portion and provided with terminal threads 8, 8, for connection with the short coupling extensions 5 as shown. Extending outwardly at the middle portion of the casing 6 is a coping 9 adapted to receive a bearing disk or other suitable device 10, between which and the lower wall of the casing is pivotally mounted the stem 11 of the delicately adjustable indicating element. Said stem 11 is provided with a needle point or other suitable bearing 12 at its other end, and the said bearing 12 is seated in a receiving bearing socket 13 in the upper end of a vertically adjustable rotatable stem 14 having a key terminal 15. The stem 14 is mounted in a bearing in the bottom of casing 6 and is normally retracted by a coiled spring 16.

17 is the vane or wing which is fixedly secured to its stem 11 by a hub 18 and when delicately pivoted by its bearing stem 11 is capable of deflection in one direction or the other by excess pressure of air against the wing, which as shown, extends across the transverse opening 7, as clearly shown in Fig. 3.

The upper end of stem 11 is provided with an indicating pointer or hand 19 arranged in alinement with the wing 17 and constituting the visible element of the device.

20 is a transparent disk, as of glass, located beyond the indicator and tightly clamped within the coping 9 under a rubber gasket 21 by a follower 22. This construction is for the purpose of effectually inclosing the interior against leakage.

The stem 14 is provided at its top with an upwardly extending partly circular flange 23 the ends of which are adapted to engage, in one direction or another, the side of the wing at its bottom, by which means the wing may be thrust back to its normal middle position, after an operation.

For the purpose of registering an operation, and locking the hand 19 in either deflected position, toward one end or the other, I have provided an upwardly extending abutment 24 secured in position below the vibrating end of the hand 19 by any suitable means, as the transverse disk or plate 10. Beyond each end of said abutment are inwardly inclined pins or horns 26, 26, against the under side of either of which the end of the hand 19 will strike and be thrown down against the end of the abutment. The middle portion of the abutment is slightly recessed as shown at 27, the weight of the wing 17 being partly supported by the end of the hand resting in said recess, in normal position.

The operation of the device is as follows:—Having been connected between the terminals of the train pipe for any two cars, upon a brake application being made, the defective valve in which the undesired quick action occurs will be indicated, (due to the more rapid exhaust of air therein) by the hand 19, which will turn in conformity with the deflection of wing 17 in one direction or the other, and the hand 19 will become fixed in position behind the abutment, recording the operation and indicating the direction of the flow. By first thrusting up pin 14 against pressure of spring 16 and then turning key 15 the hand may be quickly released and the vane returned to normal position.

I have found that, due to the undesired quick action and rapid change in pressure of the air in the train pipe, and the resulting flow of the air into or from the indicator cavity between disk 10 and glass disk 20, the indicator is affected if such circulation of air is permitted to pass around the stem of the pointer or hand. To overcome this effect and to relieve the indicator of any interference, an equalizing port 25 is made through disk 10, permitting immediate equalization of pressure between the indicator cavity and the pipe interior. As will be obvious however, any other form of bearing may be provided for the stem 11 and the arresting devices instead of the disk 10.

For the purpose of relieving the interior of the casing 6 from pressure before uncoupling from hose sections 2, 2, (the angle cocks of which are first turned to blank position) the stem 14 is provided with a valve 28 sealing against a closing seat at the upper end of the stem bearing hole 29. Said hole may be thus used as a relief port upon merely pushing the stem 14 upwardly to raise valve 28 from its seat, thereby obviating any difficulty in uncoupling the device from the hose sections after use.

In a long train, the device may be successively inserted at different points, indicating the direction of the fault, forward or back, until by finally locating it between the terminals of any single car, the valve is discovered. When the testing device is located remote from the defective valve, the operation of the indicator will be comparatively slow, but when closely adjacent thereto, it will become much more rapid, due to the varying currents, thereby assisting the operator in quickly locating the trouble.

What I claim is;—

1. An indicator device for air brake systems consisting of a chambered casing adapted for insertion in a train pipe line having a circulation opening, an indicating device subject to the pressure of the current in the pipe, means for arresting and holding the indicator, and means for releasing the indicator to allow it to return to normal position.

2. An indicator for air brake systems consisting of a chambered casing adapted for insertion in a train pipe line having a circulation opening, a pivotally mounted wing therein having a visible indicator, arresting and locking abutments arranged in the path of the indicator for engagement therewith, and means for releasing the indicator to permit it to return to normal position.

3. An indicator for air brake systems consisting of a chambered casing adapted for insertion in a train pipe line having a circulation opening, a pivotally mounted wing therein, having a visible indicator, arresting and locking abutments arranged in the path of the indicator for engagement therewith, and means for releasing the indicator to permit it to return to normal position consisting of a rotatable stem having a bearing terminal for the indicator pivot, substantially as set forth.

4. An indicator for air brake systems consisting of a chambered casing adapted for insertion in a train pipe line having a circulation opening, a pivotally mounted wing therein having a visible indicator, arresting and locking abutments arranged in the path of the indicator for engagement therewith, and means for releasing the indicator to permit it to return to normal position consisting of a rotatable stem having shoulders adapted to engage and swing the wing, substantially as set forth.

5. An indicator for air brake systems consisting of a chambered casing adapted for insertion in a train pipe line having a circulation opening, a pivotally mounted wing therein having a visible indicator, arresting and locking abutments arranged in the path of the indicator for engagement therewith, and means for releasing the indicator to permit it to return to normal position consisting of a vertically movable rotatable stem having shoulders adapted to engage and swing the wing, substantially as set forth.

6. An indicator for air brake systems consisting of a chambered casing adapted for insertion in a train pipe line having a circulation opening, a pivotally mounted wing therein having a visible indicator, arresting and locking abutments arranged in the path of the indicator for engagement therewith, and means for releasing the indicator to permit it to return to normal position consisting of a vertically movable rotatable stem having shoulders adapted to engage and swing the wing, a turning key terminal, and a retracting spring, substantially as set forth.

7. The combination with the casing and a deflectable wing therein having an attached indicating hand, of abutments and inclined guides located in the path of the indicating hand, substantially as set forth.

8. The combination with the casing, a pivoted wing therein subject to air pressure, and an indicator secured to the wing; of relief valve mechanism permitting exhaust from the interior of the casing.

9. The combination with the casing, a pivoted wing therein subject to air pressure, and an indicator secured to the wing; of a re-setting stem for the wing provided with a valve controlling exhaust from the casing.

In testimony whereof I affix my signature in presence of two witnesses.

CHARLES L. COURSON.

Witnesses:
C. M. CLARKE,
CHAS. S. LEPLEY.